United States Patent
Elfner

(10) Patent No.: US 8,583,739 B2
(45) Date of Patent: Nov. 12, 2013

(54) FACILITATING THE SENDING OF MAIL FROM A RESTRICTED COMMUNICATIONS NETWORK

(75) Inventor: Axel E. Elfner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2292 days.

(21) Appl. No.: 10/791,566

(22) Filed: Mar. 2, 2004

(65) Prior Publication Data

US 2005/0198288 A1    Sep. 8, 2005

(51) Int. Cl.
*G06F 15/16* (2006.01)
*G06F 15/173* (2006.01)

(52) U.S. Cl.
USPC ........... 709/206; 709/203; 709/218; 709/237; 709/249; 726/13

(58) Field of Classification Search
USPC ......... 709/203, 206, 207, 218, 229, 237, 248, 709/249; 726/11–15; 707/9, 10, 104.1; 710/54; 719/314; 370/395.72
See application file for complete search history.

(56) References Cited

U.S. PATENT DOCUMENTS

| | | | |
|---|---|---|---|
| 6,073,165 A * | 6/2000 | Narasimhan et al. | 709/206 |
| 6,430,691 B1 | 8/2002 | DiSanto et al. | 713/192 |
| 6,434,600 B2 * | 8/2002 | Waite et al. | 709/206 |
| 6,442,571 B1 * | 8/2002 | Haff et al. | 707/201 |
| 6,449,721 B1 | 9/2002 | Pensak et al. | 713/171 |
| 6,560,318 B1 * | 5/2003 | Spielman et al. | 379/88.12 |
| 6,631,416 B2 * | 10/2003 | Bendinelli et al. | 709/227 |
| 6,662,195 B1 * | 12/2003 | Langseth et al. | 707/200 |
| 6,728,270 B1 * | 4/2004 | Meggers et al. | 370/514 |
| 6,735,623 B1 * | 5/2004 | Prust | 709/219 |
| 6,785,819 B1 * | 8/2004 | Sakakura | 726/6 |
| 6,857,074 B2 * | 2/2005 | Bobo, II | 713/168 |
| 6,996,628 B2 * | 2/2006 | Keane et al. | 709/238 |
| 7,003,799 B2 * | 2/2006 | Jorgenson | 726/12 |
| 7,027,412 B2 * | 4/2006 | Miyamoto et al. | 370/255 |
| 7,043,240 B2 * | 5/2006 | Clarke et al. | 455/432.2 |
| 7,068,680 B1 * | 6/2006 | Kaltenmark et al. | 370/469 |
| 7,093,288 B1 * | 8/2006 | Hydrie et al. | 726/13 |
| 7,111,006 B2 * | 9/2006 | Vange et al. | 707/10 |
| 7,111,060 B2 * | 9/2006 | Araujo et al. | 709/224 |
| 7,194,004 B1 * | 3/2007 | Thomsen | 370/401 |
| 7,219,131 B2 * | 5/2007 | Banister et al. | 709/206 |
| 7,266,595 B1 * | 9/2007 | Black et al. | 709/223 |
| 7,281,049 B2 * | 10/2007 | Verma et al. | 709/229 |
| 7,310,675 B2 * | 12/2007 | Salesky et al. | 709/227 |
| 7,325,248 B2 * | 1/2008 | Syvanne | 726/11 |
| 7,376,965 B2 * | 5/2008 | Jemes et al. | 726/3 |
| 7,596,806 B2 * | 9/2009 | Chen | 726/11 |

(Continued)

OTHER PUBLICATIONS

Klensin, J. "Simple Mail Transfer Protocol," RFC 2821, Apr. 2001, pp. 1-79.*

(Continued)

*Primary Examiner* — Melvin H Pollack
(74) *Attorney, Agent, or Firm* — Heslin Rothenberg Farley & Mesiti P.C.

(57) ABSTRACT

The sending of mail from a restricted communications network is facilitated. A communications unit external to the restricted communications network periodically pulls the mail from the restricted communications network and forwards the mail to a receiver. The receiver may be the intended recipient of the mail or an intermediary used to further send the mail to the intended recipient.

11 Claims, 8 Drawing Sheets

(56) References Cited

U.S. PATENT DOCUMENTS

| | | | |
|---|---|---|---|
| 7,673,000 B2* | 3/2010 | Smoot et al. | 709/206 |
| 7,908,472 B2* | 3/2011 | Freed et al. | 713/150 |
| 7,949,785 B2* | 5/2011 | Alkhatib et al. | 709/245 |
| 8,370,528 B2* | 2/2013 | Bryers et al. | 709/249 |
| 8,434,143 B2* | 4/2013 | Xie | 726/14 |
| 2001/0014839 A1* | 8/2001 | Belanger et al. | 700/245 |
| 2002/0062316 A1* | 5/2002 | Maehiro | 707/100 |
| 2002/0147806 A1* | 10/2002 | Hasegawa | 709/223 |
| 2003/0172167 A1* | 9/2003 | Judge et al. | 709/229 |
| 2003/0233537 A1* | 12/2003 | Wohlgemuth et al. | 713/151 |
| 2004/0006643 A1* | 1/2004 | Dolson et al. | 709/246 |
| 2004/0009815 A1* | 1/2004 | Zotto et al. | 463/42 |
| 2004/0010601 A1* | 1/2004 | Afergan et al. | 709/229 |
| 2004/0049546 A1* | 3/2004 | Yoshida | 709/206 |
| 2004/0078334 A1* | 4/2004 | Malcolm et al. | 705/50 |
| 2004/0225898 A1* | 11/2004 | Frost et al. | 713/201 |
| 2006/0031927 A1* | 2/2006 | Mizuno et al. | 726/11 |
| 2006/0085503 A1* | 4/2006 | Stoye et al. | 709/206 |
| 2011/0067119 A1* | 3/2011 | Baum | 726/34 |
| 2011/0208838 A1* | 8/2011 | Thomas et al. | 709/219 |
| 2011/0307567 A1* | 12/2011 | Cunningham | 709/206 |
| 2012/0042027 A1* | 2/2012 | Abuan et al. | 709/206 |
| 2012/0059894 A1* | 3/2012 | Gardner et al. | 709/206 |
| 2012/0227101 A1* | 9/2012 | Yuan | 726/12 |

OTHER PUBLICATIONS

Hoffman, P. "SMTP Service Extension for Secure SMTP over Transport Layer Security," RFC 3207, Feb. 2002, pp. 1-9.*

Myers, J. "SMTP Service Extension for Authentication," RFC 2554, Mar. 1999, pp. 1-11.*

Freed, N. "SMTP Service Extension for Command Pipelining," RRFC 2920, Sep. 2000, pp. 1-9.*

Ylonen, T. and Lonvick, C. "The Secure Shell (SSH) Transport Layer Protocol," RFC 4253, Jan. 2006, pp. 1-32 and Errata.*

Ramsdell, B. "S/MIME Version 3 Message Specification," RFC 2633, Jun. 1999, pp. 1-32.*

Allman, M. and Ostermann, S: "FTP Security Considerations," RFC 2577, May 1999, pp. 1-8.*

Horowitz, M and Lunt, S. "FTP Security Extensions," RFC 2228, Oct. 1997, pp. 1-27.*

"Method and Apparatus for Securing E-Mail Attachments," DiSanto et al., U.S. Patent Application Publication No. US 2002/0169952 A1, published Nov. 14, 2002.

"Secure E-Mail System," Olkin et al., U.S. Patent Application Publication No. US 2003/0046533 A1, published Mar. 6, 2003.

"Authentication for Remote Connections," Katz et al., U.S. Patent Application Publication No. US 2003/0061503 A1, published Mar. 27, 2003.

* cited by examiner

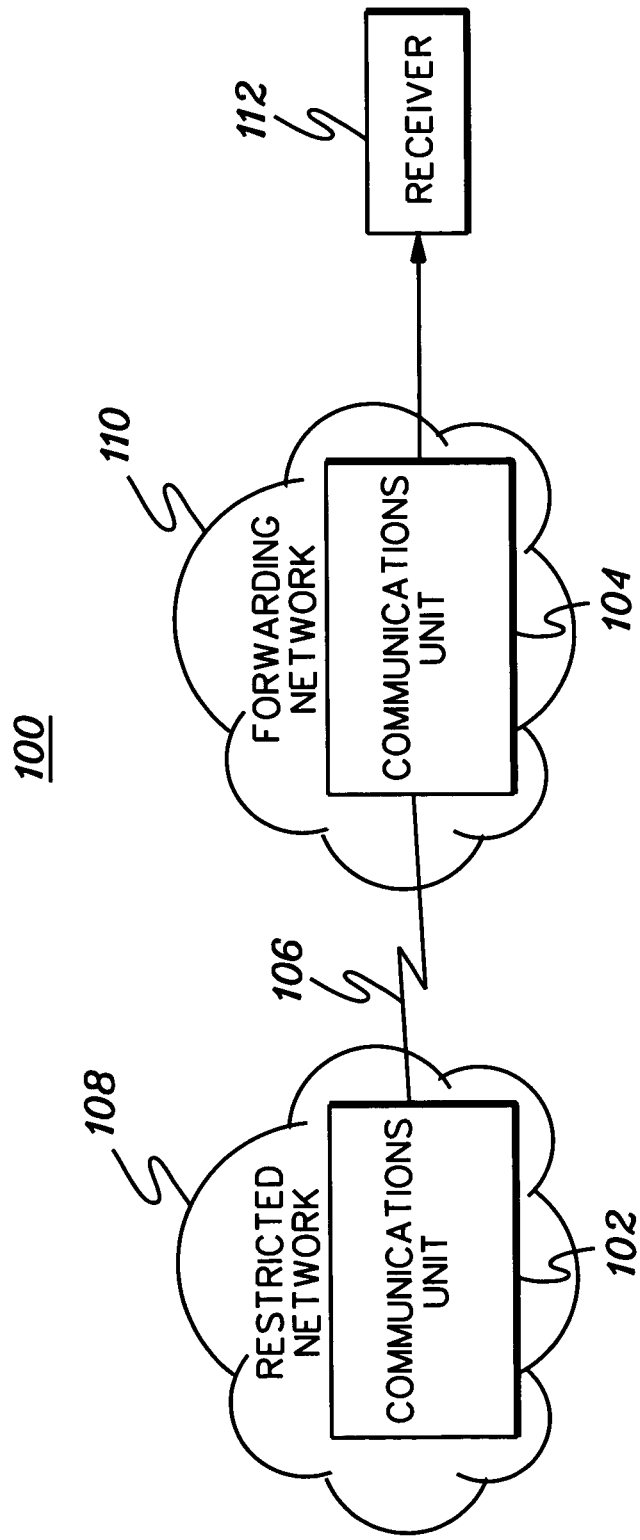

FACILITATING THE SENDING OF MAIL FROM A RESTRICTED COMMUNICATIONS NETWORK

TECHNICAL FIELD

This invention relates, in general, to electronic mail delivery, and in particular, to facilitating the sending of mail from a restricted communications network.

BACKGROUND OF THE INVENTION

In a restricted communications network, standard mechanisms for sending data as electronic mail are disabled due to security concerns. However, there are many occasions in which data needs to be sent from a restricted communications network. For instance, there may be a need to inform an administrator outside the restricted network of an event or to provide logs to be analyzed. In such situations, manual steps must be taken to send the data from the restricted network. These steps include initially moving (i.e., pushing) the data between various networks using facilities, such as File Transfer Protocol (FTP), Secure Shell (SSH), etc., and then finally sending the data from a user on a different network to a target mail address.

Manual intervention to send electronic mail is error prone and costly. Thus, a need exists for an enhanced capability to facilitate the sending of mail from a restricted communications network. As one example, a need exists for a capability that enables the automatic sending of mail from a restricted communications network.

SUMMARY OF THE INVENTION

The shortcomings of the prior art are overcome and additional advantages are provided through the provision of a method of facilitating the sending of mail from a restricted communications network. The method includes, for instance, automatically checking periodically by a communications unit external to a restricted communications network whether mail of the restricted communications network is to be sent; and retrieving by the communications unit the mail from the restricted communications network, in response to there being mail to be sent.

System and computer program products, as well as further methods, are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 depicts one embodiment of a communications environment incorporating and using one or more aspects of the present invention;

BEST MODE FOR CARRYING OUT THE INVENTION

Figure 2A:
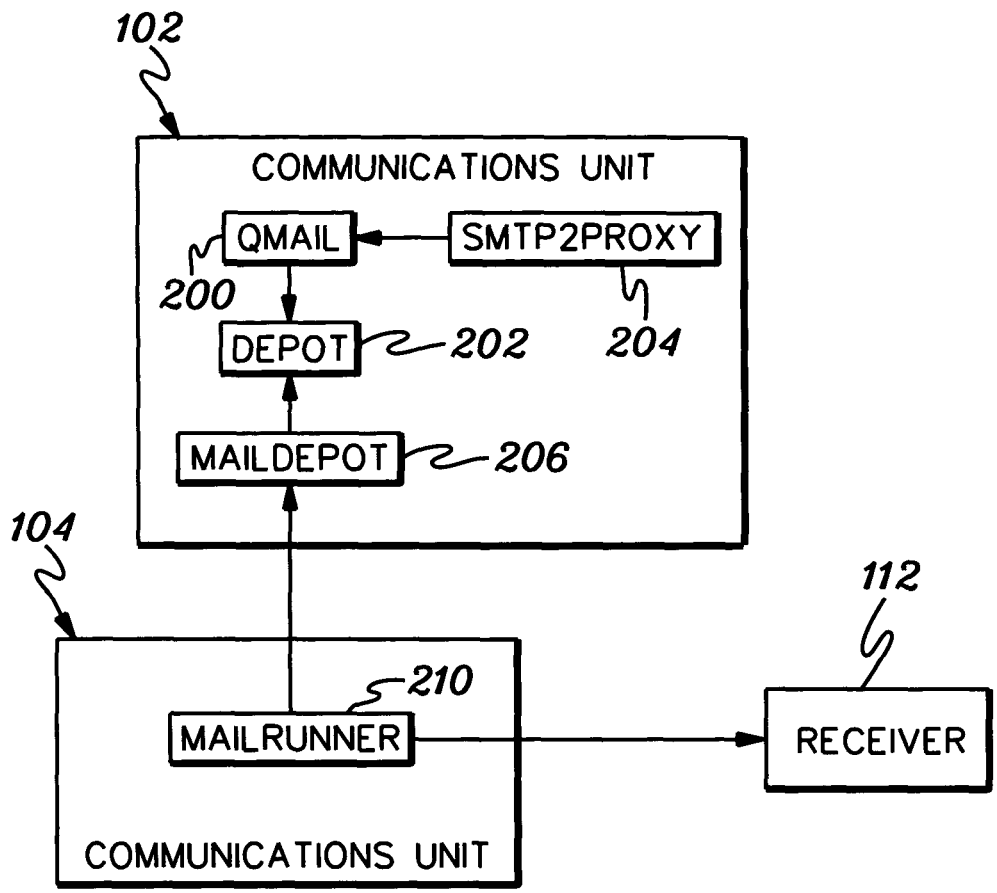
FIG. 2a depicts one embodiment of further details of the communications units of FIG. 1, in accordance with an aspect of the present invention.

In accordance with an aspect of the present invention, mail within a restricted communications network is pulled from that network and forwarded to a receiver. The receiver may be the final destination for the mail (i.e., an intended recipient) or an intermediary which facilitates forwarding the mail to the intended recipient.

One embodiment of a communications environment incorporating and using one or more aspects of the present invention is described with reference to FIG. 1. A communications environment 100 includes, for instance, one or more communications units 102 coupled to one or more communications units 104 via a connection 106. Connection 106 is, for instance, a Transmission Control Protocol/Internet Protocol (TCP/IP) connection. In another example, the connection may utilize the HyperText Transfer Protocol (HTTP) for data transfer.

Communications units 102 and 104 are, for instance, based on the UNIX architecture and execute an operating system, such as AIX, offered by International Business Machines Corporation, Armonk, N.Y. Communications unit 102 is located within a restricted network 108. Restricted network 108 is a network in which the standard mechanisms for sending data out from a network (e.g., using a Simple Mail Transfer Protocol (SMTP), such as sendmail) has been disabled, requiring manual steps to be taken. These manual steps include moving (i.e., pushing) the data between networks using facilities, such as the File Transfer Protocol (FTP) or Secure Shell, and then sending the data from a user on a different network to the target mail address.

Communications unit 104 is external to the restricted network. In one example, communications unit 104 resides within another network 110, referred to herein as a forwarding network. Forwarding network 110 is less restricted than restricted network 108 and may use a standard sending protocol, such as SMTP, or a standard mail agent, such as sendmail, which is open source software freely available on the Internet.

Communications unit 104 communicates with a receiver 112, which may be the intended recipient of the mail or may be an intermediary that is used to further send the data to its intended recipient. The manner in which communications unit 104 communicates with the receiver depends on the type of receiver, as described further below.

Additional details regarding communications unit 102 and communications unit 104 are described with reference to FIG. 2a. Communications unit 102 executes, for instance, a program 200, referred to as qmail, which is used to append mail waiting for delivery to an external communications unit to a depot file 202. As one example, qmail receives as input various arguments from a message to be delivered, such as the subject of the message, the recipient and the destination, and reads from standard input the body of the message. It then appends the subject, recipient and body of each message to the local depot file.

Figure 2B:
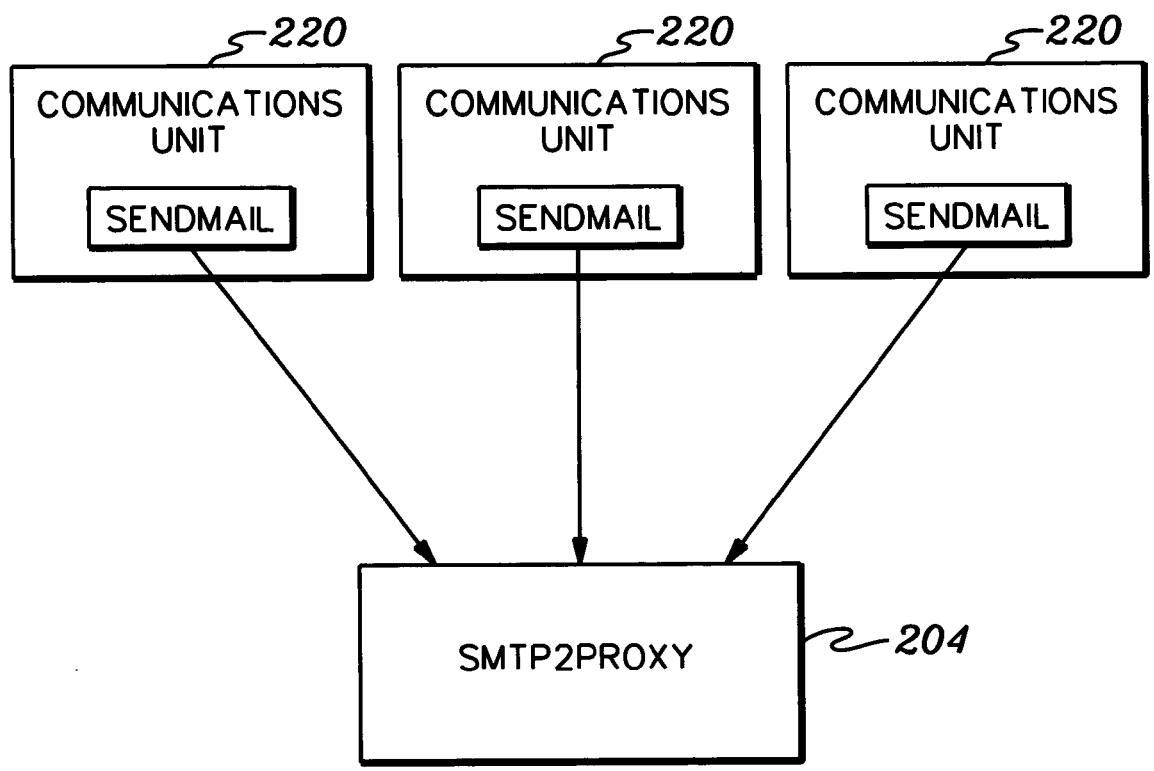
FIG. 2b depicts one embodiment of an smtp2proxy of a communications unit of FIG. 2a receiving mail from a plurality of communications units, in accordance with an aspect of the present invention.

Communications unit 102 further includes an smtp2proxy program 204, which is used to queue standard SMTP mail to qmail. For example, a userid is setup on the communications unit (e.g., server) running the smtp2proxy program. Then, other communications units in the same network send standard mail to the user id. For example, a plurality of communications units 220 (FIG. 2b) may send mail to smtp2proxy via a standard e-mail agent, such as sendmail. This allows mail to originate from more than one machine in a restricted network without requiring a mailDepot program (described below) to be implemented on each machine. The mail received by smtp2proxy is forwarded to qmail 200 (FIG. 2a) for queuing by qmail to a data structure, such as a local depot file 202. For example, the smtp2proxy program processes standard SMTP mail delivered to the userid running it. It expects subject fields to be in a format which specify both the subject of the mailing, as well as the final recipient(s), such as "subject of mail|user@destination.org, user2@destination2.com". After parsing the mail, it invokes the qmail program with appropriate subject and destination parameters, and supplies the message body as standard input, allowing the mail to be placed on the depot file for subsequent delivery through the mechanisms described herein.

Depot file 202 is accessed by a program 206, referred to herein as mailDepot, executing on communications unit 102. As one example, mailDepot 206 listens on a single configurable TCP/IP port for requests from a pulling program, such as a mail runner program 210, referred to herein as mailRunner, executing on communications unit 104. In one example, mailRunner 210 makes an inbound TCP/IP connection from the forwarding network to the restricted network over an available port, i.e., a port that is not blocked by a firewall. When an authorized request is received by mailDepot and there is data (e.g., mail) to be transferred, mailDepot serves the data to mailRunner via standard client/server mechanisms. Authorization may include, but is not limited to, validation of the IP address of the communications unit running mailRunner and a pass phrase. The data transfer mechanism between client and server incorporates concepts commonly known to the art such as encapsulating the data in some blocking format and within message header boundaries to facilitate parsing, and encryption of the data through either proprietary or openly available ciphers.

As a further example, the data transfer between mailDepot and mailRunner need not occur over a TCP/IP port dedicated to the application, but can utilize the HyperText Transfer Protocol (HTTP). That is, a web server running on the communications unit in the restricted network can serve the data via mailDepot implemented as a Common Gateway Interface (CGI) program to a communications unit in the forwarding network running mailRunner implemented as an HTTP client (like a web browser).

Regardless of the connection, in one example, the data transfer between mailDepot and mailRunner is encrypted for security. MailRunner pulls the queued mail (e.g., the depot file) across the connection and handles the mail in an appropriate manner. The manner in which the mail is handled is dependent on the type of receiver, as described below.

Figure 3A:
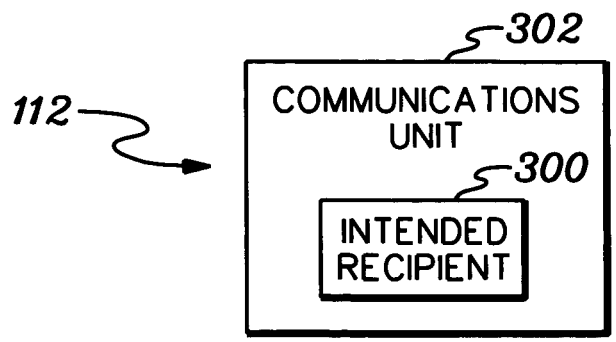
FIGS. 3a-3b depict various examples of a receiver, in accordance with an aspect of the present invention.
Figure 3B:
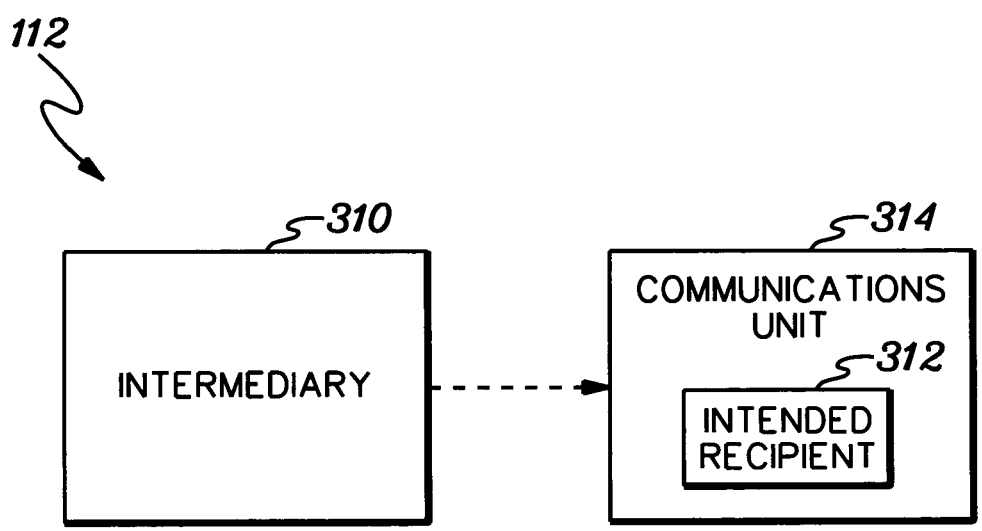

Receiver 112 may include an intended recipient 300 residing on a communications unit 302, as depicted in FIG. 3a, or it may be an intermediary 310, as shown in FIG. 3b, used to facilitate the forwarding of the mail to an intended recipient 312 of a communications unit 314. As examples, intermediary 310 may be another communications unit coupled to communications unit 314, or as a further example, the intermediary may be a program running on the same communications unit as mailRunner. The latter is further described with reference to FIG. 4a.

Figure 4A:
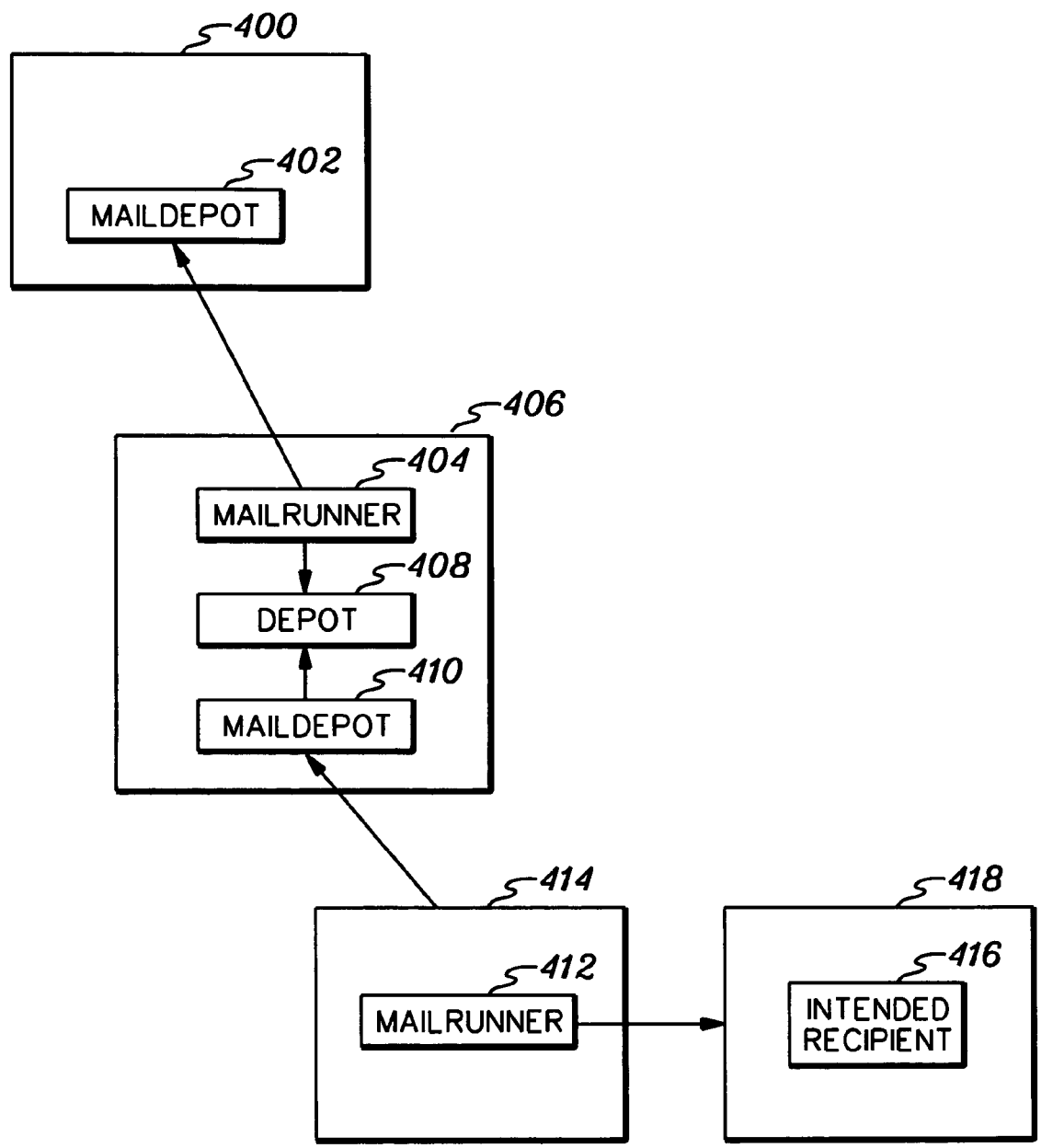
FIGS. 4a-4b depict examples of the chaining of mail runners, in accordance with an aspect of the present invention.

As shown in FIG. 4a, a communications unit 400 in a restricted network includes a mailDepot program 402. A mailRunner 404 in a communications unit 406 external to the restricted network requests mail from mailDepot 402 and queues it to a local depot file 408. This enables a mailDepot program 410 local to communications unit 406 to retrieve the mail from depot file 408 in response to a request from a mailRunner 412 executing on yet another communications unit 414. Mail runner 412 then forwards the mail to an intended recipient 416 on a communications unit 418. In this particular example, each of communications units 400, 406, 414 and 418 is within a different network. However, in other examples, one or more of the communications units may be within a same network.

Figure 4B:
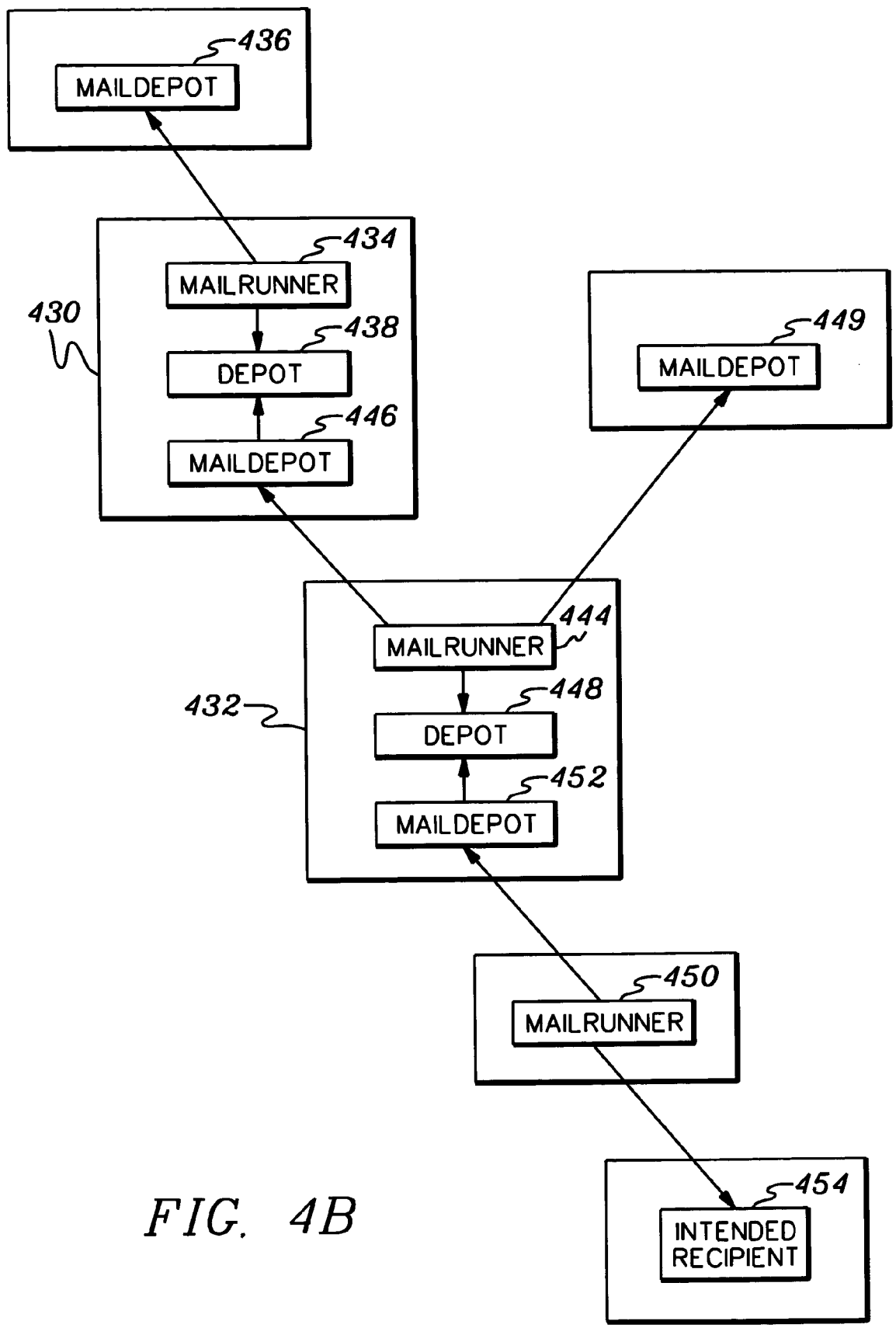

As a further example, there may be a plurality of intermediaries, each including a mail runner program queuing mail to a depot file. One example of such an environment is depicted in FIG. 4b. In this particular example, there are two instances in which a mail runner queues the mail to a depot file for further retrieval by a mail depot program. One instance is shown at 430 and the other is shown at 432. At 430, a mailRunner 434 requests mail from a mailDepot 436 and queues it to a depot file 438. Then, at 432, a mailRunner 444 requests mail from a mailDepot 446 and queues it to a depot file 448. In this example, it is shown that mailRunner 444 may also request mail from one or more other mailDepots (e.g., mailDepot 449). The mail requested from each of the mail depots is queued to depot file 448. Thereafter, a mail runner 450 requests the mail from a mailDepot 452 coupled to depot file 448. MailRunner 450 forwards the mail to an intended recipient 454.

Although various examples are given above, many other configurations are possible. For instance, there may be more or less intermediaries than that described. Further, a mailRunner may request mail from more than two mail depot programs. Many other configurations exist.

Figure 5A:
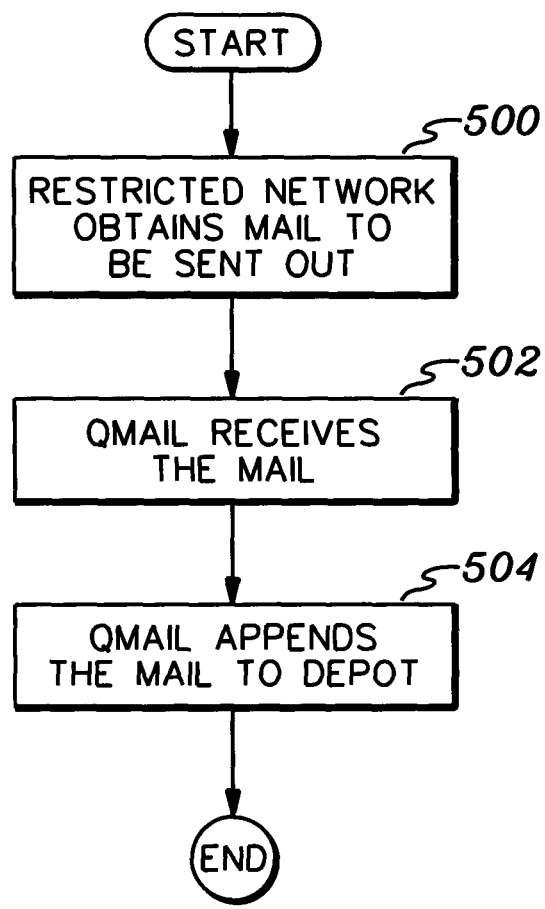
FIG. 5a depicts one embodiment of the logic associated with queuing data to be sent from a restricted communications network, in accordance with an aspect of the present invention.

One embodiment of the logic associated with sending mail from a restricted network, in accordance with an aspect of the present invention, is described with reference to FIGS. 5a-5b. FIG. 5a depicts one embodiment of the logic associated with obtaining the mail to be sent from the restricted network, while FIG. 5b depicts one embodiment of the logic associated with pulling the mail from the restricted network.

Referring initially to FIG. 5a, the restricted network obtains mail to be sent out from the restricted network, STEP 500. As examples, the mail includes informational messages, log messages, etc. that are to be sent as e-mails. These messages may be generated by programs running within the restricted network, such as monitoring programs or other programs; obtained by; or provided to the restricted network, as examples. The messages to be forwarded from the restricted network are collectively referred to as mail. The mail is provided to the qmail program, STEP 502, by direct invocation of the qmail program. This may occur by a user interactively, or by another program, including but not limited to, the smtp2proxy program. Qmail then queues the mai to the depot file, STEP 504. The queuing includes, for instance, appending the subject, recipient, and body of each message to the local depot file.

Figure 5B:
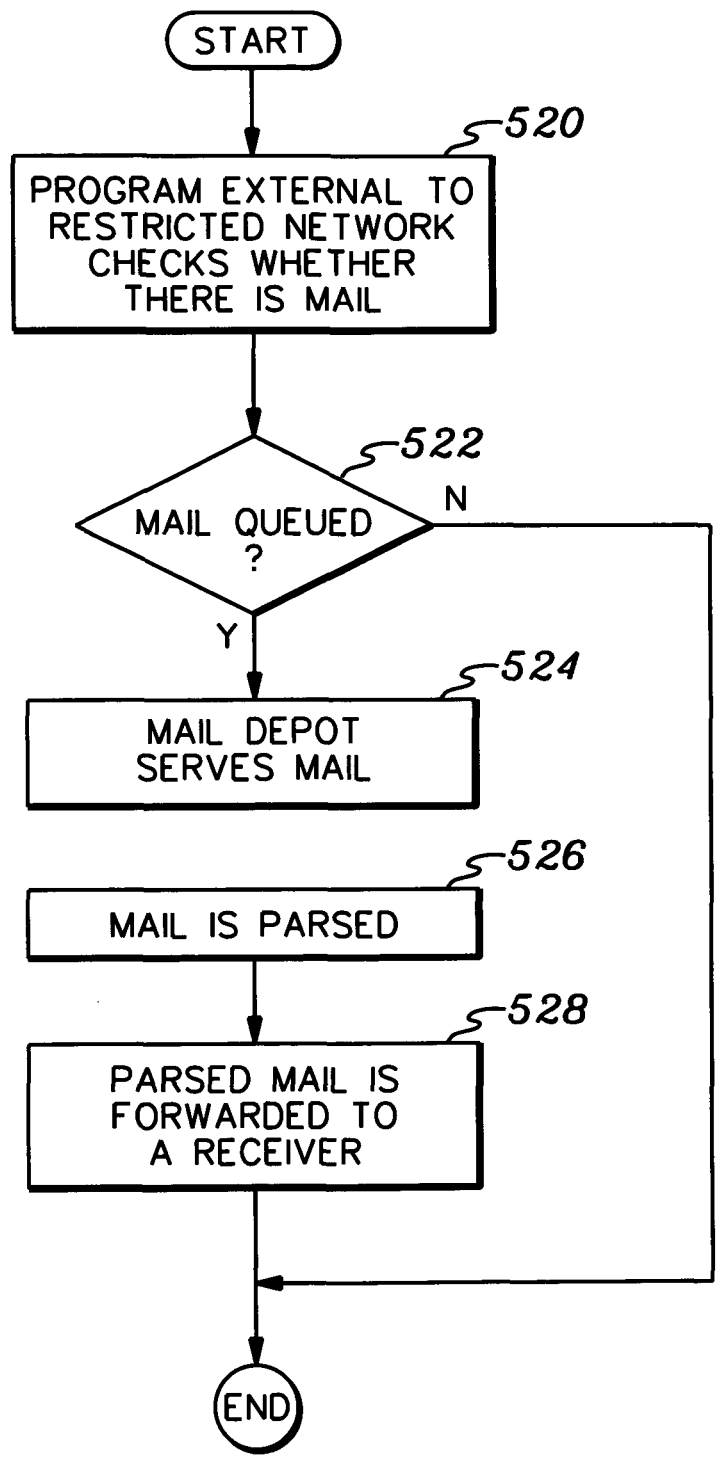
FIG. 5b depicts one embodiment of the logic associated with pulling the mail queued in FIG. 5a from the restricted communications network, in accordance with an aspect of the present invention.

Periodically, mailRunner checks whether there is any mail to be sent from the restricted network, STEP 520 (FIG. 5*b*). The periodic interval is static or configurable, and, in one example, is equal to one minute. However, many other intervals may be used. To check whether there is mail, mailRunner sends a request to mailDepot, via, for instance, an open port, asking whether there is any mail to be sent.

MailDepot listens on one or more specific ports (e.g., TCP/IP ports) for requests. When a request is received, it verifies that the request is valid by, for instance, checking the IP address of the request and other verifying information, such as a password. If the request is valid, mailDepot checks the depot file for mail. Should there be no mail, INQUIRY 522, then processing is complete. In another example, mailDepot sends a message to mailRunner indicating that there is no mail. However, if mail is queued, then mailDepot serves the mail to mailRunner via a standard client/server mechanism, STEP 524. As one example, the data transfer mechanism between client and server incorporates concepts commonly known to the art such as encapsulating the data in some blocking format and within message header boundaries to facilitate parsing, and encryption of the data through either proprietary or openly available ciphers.

MailRunner receives the pulled mail and parses the mail into the one or more individual messages comprising the mail, STEP 526. The parsing includes, for instance, reading the mail and delimiting the mail by its headers, thereby providing the individual messages. Each message is then forwarded to a receiver, STEP 528. As described above, a receiver may be an intermediary or the intended receiver. If it is an intermediary, then the mail is once again queued for retrieval by a mailRunner. If, however, it is the intended receiver, then the message is sent via a standard, unencrypted e-mail sending agent, such as sendmail.

There are many environments in which one or more aspects of the present invention can be employed. One such environment is a strategic outsourcing environment in which computer services are provided by an outsourcing entity on a contractual basis for external customers. The outsourcing entity assumes responsibility for managing/administering the computer infrastructure which runs the business of an external customer. To perform this function, computers and tools are deployed to monitor the external customer's systems for health and to inform relevant personnel if conditions requiring action are detected. The outsourcing entity clearly requires access to the computers which monitor the customer's systems. However, due to security concerns, the network from which the outsourcing entity operates cannot have direct connectivity to the customer's internal network. Thus, the monitoring computers are deployed in a middle network between the outsourcing entity's network and the customer's network. This middle network is referred to herein as the restricted network, and it has access to both the outsourcing entity's network and the customer's network, but strong firewalls between each connection are provided, thus allowing only very specific types of traffic between each network.

Previously, within this type of network, if an application running on a computer in the restricted network detected a problem with a customer's system and wanted to send an e-mail notification to the responsible administrator or anyone else, it could not. This is because there is no default means to send standard e-mail out of the restricted network, since the tool typically used to do so cannot obtain the resources required. For example, the firewall rules prohibit one or more of the required TCP/IP ports such applications, like sendmail, need to either make (outbound) or accept (inbound) connections thereon.

However, in accordance with an aspect of the present invention, a tool, referred to herein as mailProxy, includes a mechanism that makes use of the ports which the firewall rules do permit, as well as the direction in which those connections are initiated. That is, it is a pull versus a push mechanism (inbound TCP/IP from the forwarding network to the restricted network). In this scenario, queued mail data is pulled from the restricted network to another computer outside the restricted network. The computer then sends the mail to a receiver. If the receiver is the final destination, then the computer sends the mail using standard e-mail sending facilities. However, if it is not the final destination, then the mail is once again queued and the procedure is repeated.

As described above, electronic mail is pulled from the restricted network and then forwarded to a receiver. This pulling is performed automatically at periodic intervals. Thus, eliminating the manual intervention that was previously required.

Described in detail above is a capability that facilitates the automatic sending of mail from a restricted network to an intended recipient outside of the restricted network. It includes, for instance, a proxy mechanism in which a communications unit in a less restricted network, sends the mail on behalf of one or more communications units in a restricted network, since they cannot send the mail directly themselves. Advantageously, this provides a cost effective and less error prone mechanism for sending mail that resides in a restricted communications environment, which has disallowed direct SMTP traffic for security reasons. Advantageously, an aspect of the present invention enables mail to be pulled over an open port to a network from which it can be forwarded.

Although various embodiments are described above, these are only examples. Many other embodiments may include one or more aspects of the present invention. For instance, other types of environments may incorporate and/or use one or more aspects of the present invention. For example, an environment need not execute both qmail and smtp2proxy. As a further example, more or less than the number of intermediaries described herein may be used to send data to an intended recipient. As yet a further example, a mailRunner may pull mail from more than one mailDepot. This includes the mailRunner accessing the restricted network and/or mailRunners of intermediaries. Moreover, a mailRunner may access more than one restricted network.

As a further example, the communications units may be based on architectures other than UNIX and other operating systems may be executing thereon, such as Linux or other operating systems. Further, the communications units need not be homogeneous, but instead, could be heterogeneous to one another. Additionally, many types of connections may be possible to connect the various communications units.

As a further example, to provide enhanced availability, mailRunner may be run on more than one machine, preferably on different areas of the pulling network. This allows mail to continue to flow, if one runner experiences problems on, for instance, the runner machine itself or the local LAN connection to the restricted communications network. The runners' access to the depot is serialized to avoid the risk of duplicate mail.

Further, although an example is provided above in which one or more aspects of the present invention are used for an outsourcing environment, this is only one example. One or more aspects of the present invention are usable in other environments that have restricted networks. Moreover, in the above example, there may be more than one restricted network. Many other variations exist.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of sending mail, said method comprising:
providing a communications network wherein all ports used thereby for outgoing mail are closed;
accumulating outgoing mail by the communications network into a data structure;
automatically requesting outgoing mail periodically by a communications unit external to the communications network over an open port in the communications network;
verifying the communications unit and checking the data structure for outgoing mail by the communications network in response to an outgoing mail request from the communications unit;
transferring the outgoing mail from the data structure to the communications unit through one or more ports of the communications network other than the closed outgoing mail ports; and
delivering the outgoing mail to the one or more intended recipients.

2. The method of claim 1, wherein the transferring comprises pulling the outgoing mail by the communications unit through the one or more ports.

3. The method of claim 1, wherein the communications network comprises a firewall configured to close the outgoing mail ports.

4. The method of claim 1, wherein the communications network uses a Simple Mail Transfer Protocol (SMTP) for outgoing mail.

5. The method of claim 1, wherein the transferring comprises transferring the outgoing mail through the open port.

6. The method of claim 1, wherein the transferring comprises utilizing Hypertext Transfer Protocol (HTTP) to serve the outgoing mail to a HTTP client of the communications unit.

7. The method of claim 1, wherein the delivering comprises forwarding the mail from the communications unit to one or more receivers.

8. The method of claim 7, wherein a receiver of the one or more receivers comprises an intended recipient of the mail.

9. The method of claim 7, wherein a receiver of the one or more receivers comprises an intermediary to facilitate forwarding the mail to an intended recipient of the mail.

10. The method of claim 7, wherein the forwarding comprises parsing the mail into one or more messages and sending the one or more messages to the one or more receivers.

11. The method of claim 10, wherein the manner in which a message is sent to a receiver is dependent on the type of receiver.

* * * * *